(12) United States Patent
Klein et al.

(10) Patent No.: US 6,640,170 B2
(45) Date of Patent: Oct. 28, 2003

(54) REAR WHEEL STEERING SWINGOUT COMPENSATION

(75) Inventors: Steven Donald Klein, Munger, MI (US); Scott M. Wendling, Montrose, MI (US); Paul A Grougan, Novi, MI (US); Scott P Sherman, Fenton, MI (US)

(73) Assignees: Delphi Technologies, Inc., Troy, MI (US); General Motors Corporation, Detroit, MI (US)

( * ) Notice: Subject to any disclaimer, the term of this patent is extended or adjusted under 35 U.S.C. 154(b) by 0 days.

(21) Appl. No.: 09/887,513

(22) Filed: Jun. 22, 2001

(65) Prior Publication Data

US 2002/0198642 A1 Dec. 26, 2002

(51) Int. Cl.[7] .............................................. A01B 69/00
(52) U.S. Cl. ........................... 701/41; 701/36; 180/443; 180/411; 340/431
(58) Field of Search ..................... 701/41, 36; 180/443, 180/411, 408, 412, 415, 414; 303/122, 146, 150; 340/431, 671

(56) References Cited

U.S. PATENT DOCUMENTS

| | | | | |
|---|---|---|---|---|
| 4,625,822 A | * | 12/1986 | Nakamura et al. | 180/415 |
| 4,695,068 A | * | 9/1987 | Kawamoto et al. | 180/409 |
| 5,014,802 A | * | 5/1991 | Knoll et al. | 180/408 |
| 5,052,508 A | * | 10/1991 | Soejima | 180/234 |
| 5,201,382 A | * | 4/1993 | Edahiro et al. | 180/197 |
| 5,219,035 A | * | 6/1993 | Tsurumiya et al. | 180/412 |
| 5,224,042 A | * | 6/1993 | Morrison | 180/413 |
| 5,365,440 A | * | 11/1994 | Abe et al. | 701/41 |
| 5,561,603 A | * | 10/1996 | Goto | 701/41 |
| 5,718,304 A | * | 2/1998 | Lee | 180/414 |
| 5,754,966 A | * | 5/1998 | Ichikawa et al. | 701/41 |
| 6,073,067 A | * | 6/2000 | Fujiwara et al. | 701/41 |
| 6,292,094 B1 | * | 9/2001 | Deng et al. | 340/431 |

* cited by examiner

*Primary Examiner*—Marthe Y. Marc-Coleman
(74) *Attorney, Agent, or Firm*—Michael D. Smith

(57) ABSTRACT

A method of swing out compensation in a vehicle with rear wheel steering, comprising: obtaining a zero speed status signal representative of when a vehicle is at zero speed; establishing a rear wheel angle threshold; obtaining a calculated rear wheel angle; and generating a commanded rear wheel angle responsive to the rear wheel angle threshold and the calculated rear wheel angle, whichever is of smaller magnitude. A swing out compensation system for a vehicle with rear wheel steering, the system comprising: a controller; and a rear steering mechanism in communication with and responsive to the controller; wherein the controller generates a commanded rear wheel angle responsive to one of a rear wheel angle threshold and a calculated rear wheel angle, whichever is of smaller magnitude.

84 Claims, 2 Drawing Sheets

REAR WHEEL STEERING SWINGOUT COMPENSATION

BACKGROUND

Motor vehicles having four-wheel steering systems are typically defined by a set of front wheels that are steerable in unison with each other and a set of rear wheels that are likewise steerable in unison with each other. The control of the direction and angle of the steering movement of the rear steerable wheels is dependent upon steering wheel angle and the speed of travel of the motor vehicle. When steering the motor vehicle at low speeds, the rear wheels are generally steered out-of-phase or in the opposite direction of the front wheels, thereby enabling the motor vehicle to articulate turns of a small radius. When steering the motor vehicle at high speeds, the rear wheels are generally steered in-phase or in the same direction of the front wheels. When maneuvering near obstacles, the rear of the vehicle may swing out more than anticipated and collide with nearby objects. Therefore a means of limiting the swing out of a rear wheel steering vehicle is desired.

SUMMARY

A method of swing out compensation in a vehicle with rear wheel steering, comprising: obtaining a zero speed status signal representative of when a vehicle is at zero speed; establishing a rear wheel angle threshold; obtaining a calculated rear wheel angle; and generating a commanded rear wheel angle responsive to the rear wheel angle threshold and the calculated rear wheel angle, whichever is of smaller magnitude.

A swing out compensation system for a vehicle with rear wheel steering, the system comprising: a controller; and a rear steering mechanism in communication with and responsive to the controller; wherein the controller generates a commanded rear wheel angle responsive to one of a rear wheel angle threshold and a calculated rear wheel angle, whichever is of smaller magnitude.

A storage medium encoded with a machine-readable computer program code for rear wheel swing out compensation of a vehicle, the storage medium including instructions for causing controller to implement the abovementioned method.

A computer data signal embodied in a carrier wave for rear wheel swing out compensation of a vehicle, the computer data signal comprising code configured to cause a controller to implement the abovementioned method.

DETAILED DESCRIPTION

Disclosed in an exemplary embodiment is a method and system for reducing real wheel swing out in a vehicle employing rear wheel steering. An exemplary embodiment is described herein as limiting an allowable rear wheel angle (RWA) as a function of vehicle speed, or more particularly when it has been ascertained that the vehicle has stopped.

An exemplary embodiment is described herein by way of illustration as may be applied to a vehicle and more specifically a vehicle steering system. While a preferred embodiment is shown and described, it will be appreciated by those skilled in the art that the invention is not limited to the embodiment and application described herein, but also to any vehicle where rear wheel steering is employed. Moreover, while an exemplary embodiment is disclosed and illustrated with reference to a particular implementation, it will be appreciated that such illustration should not be construed as limiting. Those skilled in the art will appreciate that a variety of potential implementations and configurations are possible.

Figure 1:
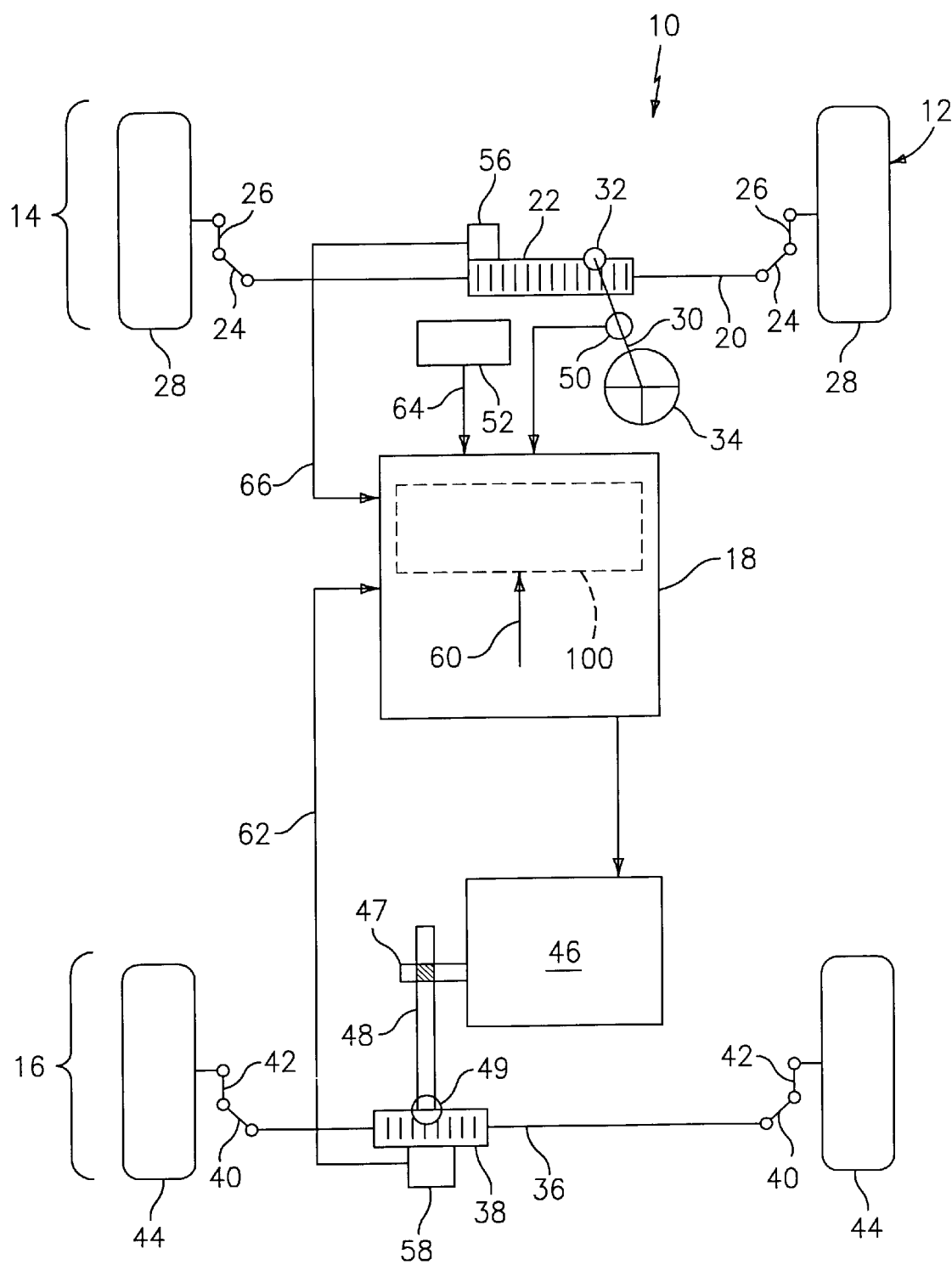
FIG. 1 is a schematic representation of a motor vehicle including front and rear steerable wheels.

Referring to FIG. 1, a block diagram partially depicting a vehicle control system 10 is depicted, hereinafter referred to as system 10. The control system 10 includes, but is not limited to, a controller 18 coupled to various sensors and interfaces for performing a variety of processes prescribed by the desired controlling functions.

System 10 is incorporable into a motor vehicle 12 to provide directional control to motor vehicle 12 and is configurable to enhance steering of the motor vehicle 12. System 10 comprises a front steering mechanism, shown generally at 14, a rear steering mechanism, shown generally at 16, and a controller 18 in communication with front steering mechanism 14 and rear steering mechanism 16. Although system 10 is described as being applicable to a rack and pinion steering arrangement, system 10 may be incorporated into other steering arrangements including, but not being limited to, integral gear steering systems.

Front steering mechanism 14 comprises a rack shaft 20, a rack 22 disposed intermediate opposing ends of rack shaft 20, a tie rod 24 disposed on each opposing end of rack shaft 20, a knuckle arm 26 connected to each tie rod 24, and a front steerable wheel 28 rotatably disposed on each knuckle arm 26. Rack shaft 20, tie rods 24, and knuckle arms 26 are configured such that front steerable wheels 28 can pivot in unison relative to a body of motor vehicle 12 to steer or to effect a change in the direction of travel of motor vehicle 12 while motor vehicle 12 is moving.

Front steering mechanism 14 further comprises a mechanism through which an operator of can effectuate a desired change in the direction of travel of motor vehicle 12. Such a mechanism comprises a steering column 30 disposed in operable communication at one end thereof with rack 22 through a pinion 32 and at an opposing end thereof with a steering device 34. Steering device 34 may be a hand steering wheel. Manipulation of steering device 34, e.g., rotation of the hand steering wheel, causes the axial rotation of steering column 30, which in turn causes the rotation of pinion 32. Rotation of pinion 32, through the engagement of rack 22 and pinion 32, effectuates the lateral translation of rack 22 relative to the body of motor vehicle 12. The lateral translation of rack 22 causes front steerable wheels 28 to angle relative to the body of motor vehicle 12, thereby altering the direction of travel of motor vehicle 12 while motor vehicle 12 is moving.

Rear steering mechanism 16 comprises a rack shaft 36, a rack 38 disposed intermediate opposing ends of rack shaft 36, a tie rod 40 disposed on each opposing end of rack shaft 36, a knuckle arm 42 connected to each tie rod 40, and a rear steerable wheel 44 rotatably disposed on each knuckle arm 42. Rack shaft 36, tie rods 40, and knuckle arms 42 are configured such that rear steerable wheels 44, like front steerable wheels 28, can be pivoted in unison relative to the body of motor vehicle 12 to steer motor vehicle 12 upon lateral translation of rack 38. A motor 46 is operably connected to rack 38 through a drive mechanism 48. Drive mechanism 48, through a pinion 49, transfers the rotational motion of a rotor shaft 47 of motor 46 to linear motion of rack 38, which effectuates the lateral motion of rack shaft 36 and, ultimately, the pivoting of rear steerable wheels 44.

Motor vehicle 12 is further provided with a steering sensor 50 for detecting an angular position of steering column 30, a vehicle speed sensor 52, and a rear rack shaft displacement sensor 58. A rack shaft displacement sensor 58 detects the displacement of its corresponding rack shaft 36 from a reference position, which is the position in which each rear steerable wheel 44 is aligned and rotatable.

Controller 18 is disposed in informational communication with the various systems of motor vehicle 12. Controller 18 receives informational signals from each of the systems, quantifies the received information, and provides an output command signal in response thereto, in this instance, for example, to the rear steering mechanism 16 through motor 46.

In order to perform the prescribed functions and desired processing, as well as the computations therefore (e.g., the execution of the rear wheel steering swing out compensation algorithm(s), and the like), controller 18 may include, but not be limited to, a processor(s), computer(s), memory, storage, register(s), timing, interrupt(s), communication interfaces, and input/output signal interfaces, and the like, as well as combinations comprising at least one of the foregoing. For example, controller 18 may include signal input signal filtering to enable accurate sampling and conversion or acquisitions of such signals from communications interfaces. Additional features of controller 18 and certain processes therein are thoroughly discussed at a later point herein.

Figure 2:
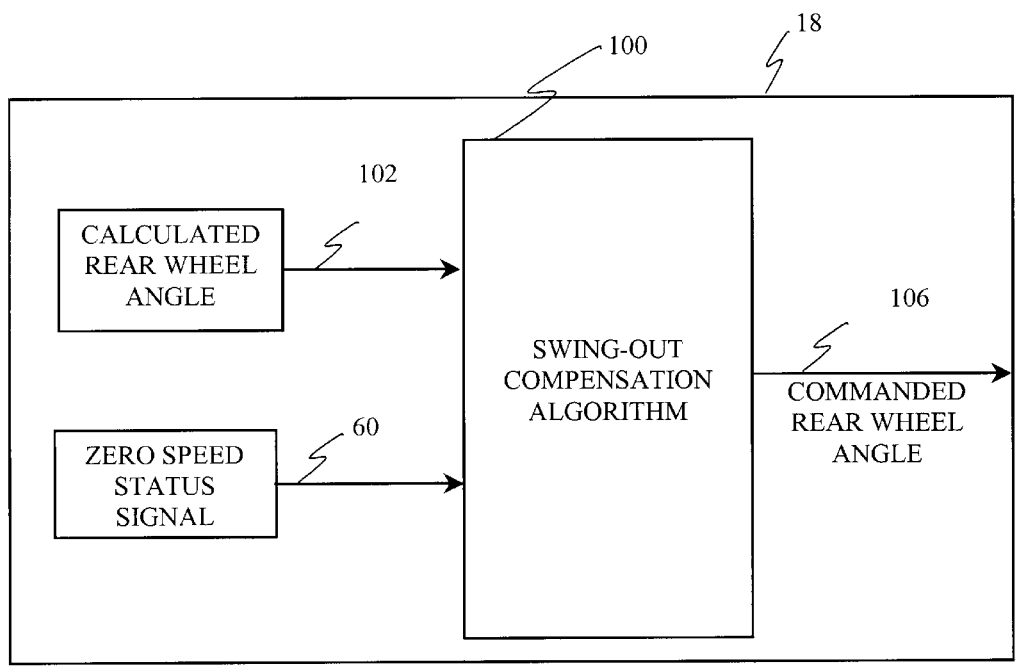
FIG. 2 is a diagram of an exemplary embodiment of the swing out compensation.
Figure 3:
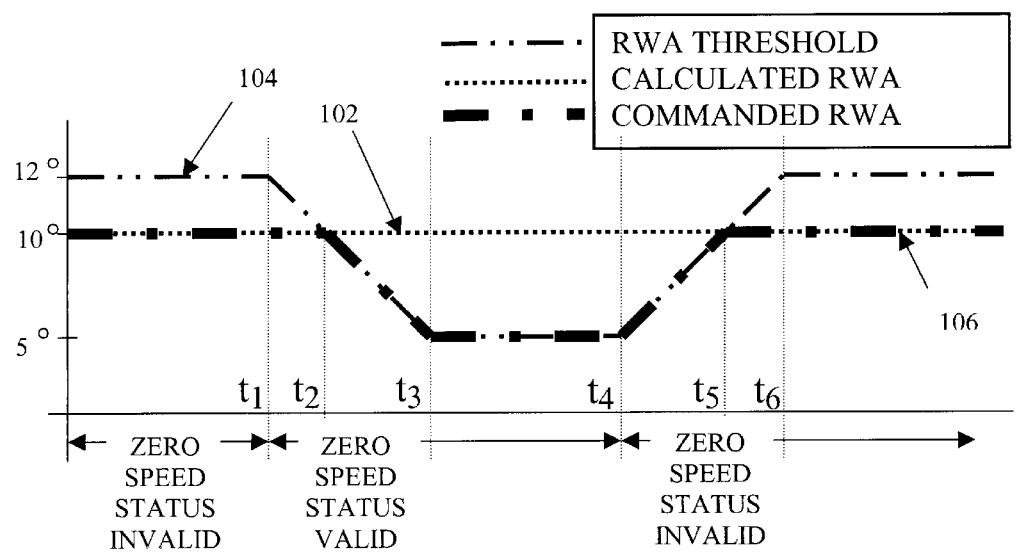
FIG. 3 is a diagram depicting the scheduling of the commanded rear wheel angle as a function of a zero speed status signal.

As exemplified in a disclosed embodiment, and as depicted in FIGS. 2 and 3, one such process may be determining from various system measurements, parameters, and states the appropriate compensation to limit vehicle swing out particularly when a vehicle is operating at approximately zero speed and/or in the vicinity of obstacles. Controller 18 receives various input signals including, but not limited to, those identified above, to facilitate such processing and may provide one or more output signals in response. In an embodiment, the controller 18 obtains as input signals or receives signals to facilitate computing the following, among others: a zero speed status signal 60, a rear rack shaft position signal 62 from a rack shaft displacement sensor 58 which detects the displacement of the corresponding rack shaft 36 from a reference position, and thereby the position of each rear steerable wheel 44, and the vehicle speed signal 64, which is transmitted to controller 18 from the vehicle speed sensor 52. Controller 18 generates as an output signal a command to position the rear wheels, which is transmitted to motor 46.

A swing out compensation algorithm 100 generates a limiting function to facilitate limiting the commanded RWA 106 under selected conditions regardless of magnitude of a desired or calculated RWA 102. The limiting is scheduled and defined by an allowable RWA threshold 104. Turning now to FIG. 3, which depicts the scheduling of the commanded RWA 106 as a function of the zero speed status signal 60, the RWA threshold 104, calculated RWA 102, and time. It is noteworthy to appreciate that FIG. 3 depicts the scheduling for one phase or the absolute value of the calculated RWA 102. It may be noted that a similar but opposite phase limits would be employed for negative calculated RWA's 102.

The zero speed status signal 60 may comprise any signal determining the status of the vehicle speed, in this instance, determining that the vehicle has stopped. Such a zero speed status signal 60 may be derived from a variety of sources including, but not be limited to a vehicle speed sensor as disclosed, other speed sensors such as wheel speed sensors, for example, as may be employed in an anti-lock braking system, gear train speed detection sensors, or other sensors employed to detect the speed or motion of a vehicle such as radio, Doppler, laser, and the like, including combinations thereof. Referring to FIGS. 2 and 3, the swing out compensation algorithm 100 monitors the calculated RWA value 102 and the state of the zero speed status signal 60. The calculated RWA value 102 is the desired RWA for normal existing rear wheel steering operation. Such a calculated RWA value may for example be a function of, but not limited to, the vehicle speed signal 64, the front wheel angle signal 66 representative of front wheel angle motion as detected by rack sensor 56, the hand wheel position as detected by steering sensor 50, vehicle static and dynamic conditions, and the like, as well as combinations of the foregoing.

When zero speed status signal 60 is valid, that is, there is an indication that the vehicle is at approximately zero speed, the allowable RWA threshold value 104 is reduced to a selected value. Consequently, maximum RWA command value 106 is also reduced to coincide with the reduced value of the RWA threshold value 104. The reduction may be monitored to control the slew rate between the two conditions. In an embodiment, a normal operation maximum RWA threshold value 104 of about 12 degrees is reduced to about 5 degrees with a slew rate of approximately 2 degrees per second, thereby, limiting the RWA command value 106 to the same values.

Therefore, as depicted by the graph of FIG. 3, for a calculated RWA value 102 of 10 degrees, with the zero speed status signal 60 not valid, the RWA threshold value 104 is at 12 degrees, and the entire 10-degree travel will be commanded and achieved. However, the status of the zero speed status signal 60 changes to valid (e.g., at $t_1$ in FIG. 3), the allowable maximum RWA threshold value 104 is gradually reduced at the selected rate. It is noteworthy to recognize that as the maximum RWA threshold value 104 is reduced and it intercepts the calculated RWA 102 of 10 degrees (e.g., at $t_2$ in FIG. 3), the actual commanded RWA value 106 then follows the slewing limit of the RWA threshold 104 until it achieves the selected limit, in this instance 5 degrees (e.g., at $t_3$ in FIG. 3). Similarly, as the zero speed status signal 60 becomes invalid, (e.g., at $t_4$ in FIG. 3) and for the same 10 degree calculated RWA 102, the RWA threshold value 104 is gradually increased at the selected rate. Thereby, the commanded RWA value 106 once again follows the slewing limit until it achieves in this instance the 10 degree calculated RWA value 102 (e.g., at $t_5$ in FIG. 3) even though the RWA threshold value 104 continues to slew back to the 12 degree maximum allowable as depicted at $t_6$ in FIG. 3.

It is noteworthy to appreciate that while particular limits of about 12 degrees and about 5 degrees have been disclosed, such limits are for illustration of the exemplary embodiment. It should be appreciated that a variety of limits are conceivable and may very well be different than those disclosed based upon such factors as vehicle geometry, wheel and tire characteristics, driving and road surface characteristics, and the like, as well as combinations thereof. Moreover, it is also noteworthy to appreciate that while a particular illustrative transition (e.g., 2 degrees per second) between the limits of 12 degrees and 5 degrees and vice versa has been disclosed, again such specifics are for illustration of the exemplary embodiment. It should be appreciated that a variety of slew rates are conceivable, which are likely to be different than those disclosed based upon such factors as those disclosed herein.

The disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of swing out compensation in a vehicle with rear wheel steering, the method comprising:

obtaining a zero speed status signal representative of when a vehicle is at zero speed;

establishing a rear wheal angle threshold;

obtaining a calculated rear wheel angle;

generating a commanding rear wheel angle responsive to said rear wheel angle threshold and said calculated rear wheel angle, whichever is of smaller magnitude; and wherein said rear wheel angle threshold is about 12 degrees when said zero speed status signal is invalid transitioning to about 5 degrees when said zero speed status signal becomes valid, and transitioning to about 12 degrees when said zero speed status signal becomes invalid.

2. The method of claim 1 wherein said rear wheel angle threshold includes transitioning far one rear wheel angle to another rear wheel angle at a selected slew rate.

3. The method of claim 2 wherein said selected slew rate is about two degrees per second.

4. A method of swing out compensation in a vehicle with rear wheel steering, the method comprising:

obtaining a zero speed status signal representative of when a vehicle is at zero speed;

establishing a rear wheel angle threshold;

obtaining a calculated rear wheel angle;

generating a commanded rear wheel angle responsive to said rear wheel angle threshold and said calculated rear wheel angle, whichever is of smaller magnitude; and wherein said rear wheel angle threshold includes transitioning from one rear wheel angle to another rear wheel angle at a selected slew rate.

5. The method of claim 4 wherein said calculated rear wheel angle represents a desired rear wheel angle to affect said rear wheel steering.

6. The method of claim 5 wherein said rear wheel angle threshold comprises a limit on a rear wheel angular travel on said vehicle.

7. The method of claim 6 wherein said rear wheel angle threshold is responsive to vehicle speed.

8. The method of claim 7 wherein said rear wheel angle threshold is about 12 degrees when said zero speed status signal is invalid transitioning to about 5 degrees when said zero speed status signal becomes valid, and transitioning to about 12 degrees when said zero speed status signal becomes invalid.

9. The method of claim 6 wherein said rear wheel angle threshold is about 5 degrees.

10. The method of claim 6 wherein said rear wheel angle threshold is established at a second rear wheel angle of about 12 degrees.

11. The method of claim 4 wherein said rear wheel angle threshold comprises a limit on a rear wheel angular travel on said vehicle.

12. The method of claim 11 wherein said rear wheel angle threshold is responsive to vehicle speed.

13. The method of claim 11 wherein said rear wheel angle threshold is established at a first rear wheel angle of about 5 degrees.

14. The method of claim 11 wherein said rear wheel angle threshold is established at a second rear wheel angle of about 12 degrees.

15. The method of claim 4 wherein said selected slew rate is about two degrees per second.

16. The method of claim 4 wherein said zero speed status signal is responsive to measurements from a speed sensor.

17. The method of claim 4 wherein said zero speed status signal is responsive to estimates of speed of said vehicle.

18. A method of swing out compensation in a vehicle with rear wheel steering, to method comprising:

obtaining a zero speed status signal representative of when a vehicle is at zero speed;

establishing a rear wheel angle threshold;

obtaining a calculated rear wheel angle;

generating a commanded rear wheel angle responsive to said rear wheel angle threshold and said calculated rear wheel angle, whichever is of smaller magnitude;

wherein said calculated rear wheel angle represents a desired rear wheel angle to affect said rear wheel steering;

wherein said rear wheel angle threshold comprises a limit on a rear wheel angular travel on said vehicle;

wherein said rear wheel angle threshold is responsive to vehicle speed; and wherein said rear wheel angle threshold includes transitioning from one rear wheel angle to another rear wheel angle at a selected slaw rate.

19. The method of claim 18 wherein said selected slew rate is about two degrees per second.

20. The method of claim 19 wherein said zero speed status signal is responsive to measurements from a speed sensor.

21. The method of claim 20 wherein said zero speed status signal is responsive to estimates of speed of said vehicle.

22. A swing out compensation for a vehicle with rear wheel steering, the system comprising:
   a controller; and
   a rear steering mechanism in communication with and responsive to said controller; and
   wherein said controller generates a commanded rear wheel angle responsive to one of a rear wheel angle threshold and a calculated rear wheel angle, whichever is of smaller magnitude;
   wherein said rear wheel angle threshold is about 12 degrees when said zero speed status signal is invalid transitioning to about 5 degrees when said zero speed status signal becomes valid, and transitioning to about 12 degrees when said zero speed status signal becomes invalid.

23. The swing out compensation system of claim 22 wherein said rear wheel angle threshold includes transitioning for one rear wheel angle to another rear wheel angle at a selected slew rate.

24. The swing out compensation system of claim 23 wherein said selected slew rate is about two degrees per second.

25. A swing out compensation system for a vehicle with rear wheel steering, the system comprising:
   a controller; and
   a rear steering in communication with and responsive to said controller; and
   wherein said controller generates a commanded rear wheel angle responsive to one of a rear wheel angle threshold and a calculated rear wheel angle, whichever is of smaller magnitude;
   wherein said rear wheel angle threshold includes transitioning from one rear wheel angle to another rear wheel angle at a selected slew rate.

26. The swing out compensation system of claim 25 wherein said calculated roar wheel angle represents a desired rear wheel angle to affect said rear wheel steering.

27. The swing out compensation system of claim 26 wherein said rear wheel angle threshold comprises a limit on a rear wheel angular travel on said vehicle.

28. The swing out compensation system of claim 27 wherein said rear wheel angle threshold is responsive to vehicle speed.

29. The swing out compensation system of claim 28 wherein said rear wheel angle threshold is about 12 degrees when said zero speed status signal is invalid transitioning to about 5 degrees when said zero speed status signal becomes valid, and transitioning to about 12 degrees when said zero speed status signal becomes invalid.

30. The swing out compensation system of claim 28 wherein said rear wheel angle threshold includes transitioning from one rear wheel angle to another rear wheel angle at a selected slew rate.

31. The swing out compensation system of claim 30 wherein said selected slew rate is about two degrees per second.

32. The swing out compensation system of claim 31 wherein said zero speed status signal is responsive to measurements from a speed sensor.

33. The swing alit compensation system of claim 32 wherein said zero speed status signal is responsive to estimates of speed of said vehicle.

34. The swing out compensation system of claim 27 wherein said rear wheel angle threshold is about 5 degrees.

35. The swing out compensation system of claim 27 wherein said rear wheel angle threshold is established at a second rear wheel angle of about 12 degrees.

36. The swing out compensation system of claim 25 wherein said rear wheel angle threshold comprises a limit on a rear wheel angular travel on said vehicle.

37. The swing out compensation system of claim 36 wherein said rear wheel angle threshold is responsive to vehicle speed.

38. The swing out compensation system of claim 36 wherein said rear wheel angle threshold is established at a first rear wheel angle of about 5 degrees.

39. The swing out compensation system of claim 36 wherein said rear wheel angle threshold is established at a second rear wheel angle of about 12 degrees.

40. The swing out compensation system of claim 25 wherein said selected slew rate is about two degrees per second.

41. The swing out compensation system of claim 25 wherein said zero speed status signal is responsive to measurements from a speed sensor.

42. The swing out compensation system of claim 25 wherein said zero speed status signal is responsive to estimates of speed of said vehicle.

43. A storage medium encoded with a machine-readable computer program code for method of swing out compensation in a vehicle with rear wheel steering, said storage medium including instructions for causing controller to implement a method comprising:
   obtaining zero speed status signal representative of when a vehicle is at zero speed;
   establishing a rear wheel angle threshold;
   obtaining a calculated rear wheel angle;
   generating a commanded rear wheel angle responsive to said rear wheel angle threshold and said calculated rear wheel angle, whichever is of smaller magnitude; and
   wherein said rear wheel angle threshold is about 12 degrees when said zero speed status signal is invalid transitioning to about 5 degrees when said zero speed status signal becomes valid, and transitioning to about 12 degrees when said zero speed status signal becomes invalid.

44. The storage medium of claim 43 wherein said rear wheel angle threshold includes transitioning for one rear wheel angle to another rear wheel angle at a selected slew rate.

45. The storage medium of claim 44 wherein said selected slew rate is about two degrees per second.

46. A storage medium encoded with a machine-readable computer program code for method of swing out compensation in a vehicle with rear wheel steering, said storage medium including instructions for causing controller to implement a method comprising:
   obtaining a zero speed status signal representative of when a vehicle is at zero speed;
   establishing a rear wheel angle threshold;
   obtaining a calculated rear wheel angle;
   generating a commanded rear wheel angle responsive to said rear wheel angle; threshold and said calculated rear wheel angle, whichever is of smaller magnitude; and
   wherein said tear wheel angle threshold includes transitioning front one rear wheel angle to another rear wheel angle at a selected slew rate.

47. The storage medium of claim 46 wherein said calculated rear wheel angle represents a desired rear wheel angle to affect said rear wheel steering.

48. The storage medium of claim 47 wherein said rear wheel angle threshold comprises a limit on a rear wheel angular travel on said vehicle.

49. The storage medium of claim 48 wherein said rear wheel angle threshold is responsive to vehicle speed.

50. The storage medium of claim 49 wherein said rear wheel angle threshold is about 12 degrees when said zero speed status signal is invalid transitioning to about 5 degrees when said zero speed status signal becomes valid, and transitioning to about 12 degrees when said zero speed status signal becomes invalid.

51. The storage medium of claim 49 wherein said rear wheel angle threshold includes transitioning from one rear wheel angle to another rear wheel angle at a selected slow rate.

52. The storage medium of claim 51 wherein said selected slew rate is about two degrees per second.

53. The storage medium of claim 52 wherein said zero speed status signal is responsive to measurements from a speed sensor.

54. The storage medium of claim 53 wherein said zero speed status signal is responsive to estimates of speed of said vehicle.

55. The storage medium of claim 48 wherein said rear wheel angle threshold is about 5 degrees.

56. The storage medium of claim 48 wherein said rear wheel angle threshold is established at a second rear wheel angle or about 12 degrees.

57. The storage medium of claim 46 wherein said rear wheel angle threshold comprises a limit on a rear wheel angular travel on said vehicle.

58. The storage medium of claim 57 wherein said rear wheel angle threshold is responsive to vehicle speed.

59. The storage medium of claim 57 wherein said rear wheel angle threshold is established at a first rear wheel angle of about 5 degrees.

60. The storage medium of claim 57 wherein said rear wheel angle threshold is established at a second rear wheel angle of about 12 degrees.

61. The storage medium of claim 46 wherein said selected slew rate is about two degrees per second.

62. The storage medium of claim 46 wherein said zero speed status signal is responsive to measurements from a speed sensor.

63. The storage medium of claim 46 wherein said zero speed status signal is responsive to estimates of speed of said vehicle.

64. A computer data signal embodied in a carrier wave for determining swing out compensation in a vehicle with rear wheel steering, said computer data signal comprising code configured to cause a controller to implement a method comprising:

obtaining a zero speed status signal representative of when a vehicle is at zero speed;

establishing a rear wheel angle threshold;

obtaining a calculated rear wheel angle;

generating a commanded rear wheel angle responsive to said rear wheel angle threshold and said calculated rear wheel angle, whichever is of smaller magnitude; and wherein said rear wheel angle threshold is about 12 degrees when said zero speed status signal is invalid transitioning to about 5 degrees when said zero speed status signal becomes valid, and transitioning to about 12 degrees when said zero speed status signal becomes invalid.

65. The computer data signal of claim 64 wherein said rear wheel angle threshold includes transitioning for one rear wheel angle to another rear wheel angle at a selected slew rate.

66. The computer data signal of claim 65 wherein said selected slew rate is about two degrees per second.

67. A computer data signal embodied in a carrier wave for determining swing out compensation in a vehicle with rear wheel steering, said computer data signal comprising code configured to cause a controller to implement a method comprising:

obtaining a zero speed status signal representative of when a vehicle is at zero speed;

establishing a rear wheel angle threshold;

obtaining a calculated rear wheel angle;

generating a commanded rear wheel angle responsive to said rear wheel angle threshold and said calculated rear wheel angle, whichever is of smaller magnitude; and wherein said rear wheel angle threshold includes transitioning from one rear wheel angle to another rear wheel angle at a selected slew rate.

68. The computer data signal of claim 67 wherein said calculated rear wheel angle represents a desired rear wheel angle to affect said rear wheel steering.

69. The computer data signal of claim 68 wherein said rear wheel angle threshold comprises a limit on a rear wheel angular travel on said vehicle.

70. The computer data signal of claim 69 wherein said rear wheel angle threshold is responsive to vehicle speed.

71. The computer data signal of claim 70 wherein said rear wheel angle threshold is about 12 degrees when said zero speed status signal is invalid transitioning to about 5 degrees when said zero speed status signal becomes valid, and transitioning to about 12 degrees when said zero speed status signal becomes invalid.

72. The computer data signal of claim 70 wherein said rear wheel angle threshold includes transitioning from one rear wheel angle to another rear wheel angle at a selected slew rate.

73. The computer data signal of claim 72 wherein said selected slew rate is about two degrees per second.

74. The computer data signal of claim 73 wherein said zero speed status signal is responsive to measurements from a speed sensor.

75. The computer data signal of claim 74 wherein said zero speed status signal is responsive to estimates of speed of said vehicle.

76. The computer data signal of claim 69 wherein said rear wheel angle threshold is about 5 degrees.

77. The computer data signal of claim 69 wherein said rear wheel angle threshold is established at a second rear wheel angle of about 12 degrees.

78. The computer data signal of claim 67 wherein said rear wheel angle threshold comprises a limit on a rear wheel angular travel on said vehicle.

79. The computer data signal of claim 78 wherein said rear wheel angle threshold is responsive to vehicle speed.

80. The computer data signal of claim 78 wherein said rear wheel angle threshold is established at a first rear wheel angle of about 5 degrees.

81. The computer data signal of claim 78 wherein said rear wheel angle threshold is established at a second rear wheel angle of about 12 degrees.

82. The computer data signal of claim 67 wherein said selected slew rate is about two degrees per second.

83. The computer data signal of claim 67 wherein said zero speed status signal is responsive to measurements from a speed sensor.

84. The computer data signal of claim 67 wherein said zero speed status signal is responsive to estimates of speed of said vehicle.

* * * * *